United States Patent [19]

Moore

[11] Patent Number: 5,544,851
[45] Date of Patent: Aug. 13, 1996

[54] BRACKET FOR EXTERIOR MOUNTINGS ON BUILDINGS

[76] Inventor: Steven A. Moore, 1125 Emilie St., Green Bay, Wis. 54301

[21] Appl. No.: 323,902

[22] Filed: Oct. 17, 1994

[51] Int. Cl.$^6$ .................................................. F21V 21/20
[52] U.S. Cl. ................. 248/544; 248/291.1; 248/292.11; 362/401; 362/430; 362/432
[58] Field of Search ..................................... 248/237, 514, 248/534, 539, 544, 291.1, 292.11; 362/382, 396, 401, 427, 430, 432; 52/28

[56] References Cited

U.S. PATENT DOCUMENTS

| | | | |
|---|---|---|---|
| 1,971,757 | 8/1934 | Nerem | 362/401 X |
| 2,575,254 | 11/1951 | Blaugrund | 248/237 X |
| 2,628,796 | 2/1953 | Krizman | 248/237 X |
| 2,653,002 | 9/1953 | Passman | 362/427 X |
| 2,667,317 | 1/1954 | Trebules | 248/291 X |
| 2,690,318 | 9/1954 | Kusiv | 248/539 |
| 2,695,149 | 11/1954 | Chabot | 248/237 X |
| 2,717,751 | 9/1955 | Kusiv | 248/539 |
| 3,094,303 | 6/1963 | Belger | 248/514 |
| 3,333,802 | 8/1967 | Goodman . | |
| 3,450,378 | 6/1969 | Cucka . | |
| 4,167,033 | 9/1979 | Fletcher . | |
| 4,181,284 | 1/1980 | Seppelfrick | 248/514 |
| 4,500,064 | 2/1985 | Calabro . | |
| 4,595,165 | 6/1986 | Klingensmith et al. | 248/539 |

*Primary Examiner*—Ramon O. Ramirez
*Assistant Examiner*—Derek J. Berger
*Attorney, Agent, or Firm*—Thomas D. Wilhelm; Brian R. Tumm

[57] ABSTRACT

This invention pertains to brackets for mounting fixtures and the like to buildings, especially at elevated locations and to servicing such fixtures. Brackets of the invention include a wall mount subassembly for mounting directly to e.g. a vertical wall of the building, and an interface subassembly which serves as an interface between the wall mount subassembly and a fixture, optionally also a fixture holder. The interface subassembly preferably is mounted for pivotation with respect to the wall mount subassembly, whereby the fixture secured to the interface subassembly can be pivoted toward or over the roof or other safe place on the building for installation or servicing of the fixture or fixture holder. In some embodiments, the combination of the fixture, fixture holder, and interface subassembly is readily removed, or installed onto, the wall mount subassembly as a unit.

49 Claims, 5 Drawing Sheets

FIG. 6

BRACKET FOR EXTERIOR MOUNTINGS ON BUILDINGS

FIELD OF THE INVENTION

This invention relates to mounting of light fixtures and other apparatus on buildings, especially at heights far enough above ground level that workers are at risk when installing and servicing the apparatus mounted to the building.

BACKGROUND OF THE INVENTION

A worker mounting a fixture to a building, at an elevated location typically uses a bracket as an interface between the building and the fixture. Typically, a pipe or the like is incorporated into the bracket either integrally or as a separate element, to serve as an interface between the bracket and the fixture. First, the bracket is mounted to the building. After the bracket is mounted to the building at the elevated location, the fixture is mounted to the bracket, also at the elevated location.

On a two or three story building, lights are typically mounted at or near the top of the building, with the fixture holder holding the fixture away from the building in order to give light around the building. A light fixture may, for example, be mounted on a wall or parapet which surrounds a flat roof common to commercial buildings. Brackets for such mountings are available in a variety of configurations, with the fixture itself typically holding the bulb some distance away from the building.

Typically, the bracket can be mounted to the wall of the building in relative safety because the bracket is mounted on the wall surface. However, workers have difficulties with fixture installation and with servicing the light fixtures, themselves, because of the remote position of the fixture, fixture holder, and the like, with respect to safe support loci on and about the building. For example, using a conventional fixture and mounting bracket, the worker stands on the roof to service the fixture. From that position, the worker reaches far out into empty space to work on the component to be serviced - for example to remove a spent bulb, and replace it with a fresh bulb; or to replace a broken globe. Such reaching, of course, presents the possibility of the service technician losing his/her balance, or otherwise becoming unstable, and falling off the roof under such hazardous conditions.

In the alternative, the worker might attempt to reach the bracket, and dismount it from the building. But such brackets are typically mounted to the building with more or less permanent mounting hardware, such that dismounting is difficult. In addition, the overall assemblage of bracket plus fixture is heavy enough to contribute further to worker instability. So this course is not followed.

In some cases, the bulb is simply not within reach. Then the service technician may be lifted up to the fixture in a lift truck, a cherry picker, or the like, or may use other lifting apparatus to reach the fixture.

Such procedures include both the expense of any specialized equipment used, and the expense of the liability when a worker is injured. Whatever method is used, the service technician remains at risk on a precarious perch using conventional technology.

The building offers relative safety from falling, if only the worker could do his work while securely located on the building, e.g. inside the parapet on the roof.

The overall objective of the invention is to provide a mounting bracket for mounting virtually any commercially available fixture (or other application apparatus) on the building near a safe support surface such as the roof, and whereby any subsequent servicing of the fixture can be done over or adjacent the safe support surface without the service technician having to extend himself or herself dangerously beyond the confines of that safe surface.

It is an objective of the invention to provide a bracket for mounting a fixture to the wall of a building, including a wall mount subassembly for mounting to the building, an interface subassembly for serving as an interface between the wall mount assembly and a fixture or fixture holder, with the bracket in total providing both primary load bearing support and primary directional support to hold the fixture in a given (e.g. upright) attitude.

It is another object of the invention to provide such a bracket having load bearing legs spacing the fixture or fixture holder from the building wall below the roof line far enough that the fixture can extend outwardly of the roof overhang and upwardly above the roof.

It is still another object to provide such a bracket wherein the interface subassembly is mounted to the wall mount subassembly by a pivot bolt, such that the interface subassembly and the fixture are mounted for pivotation about the wall mount subassembly. This allows the service technician to pivot the fixture over the roof, where he can safely service the fixture, while the bracket, through the pivot bolt continues to support the weight of the fixture and interface subassembly.

It is yet another object to provide a method of mounting a fixture to a wall by first mounting the wall mount subassembly to the wall, and subsequently mounting the fixture to the wall mount subassembly through the interface subassembly.

Still another object of the invention is to provide a method of servicing a fixture mounted to a building by releasing an interface lock, followed by pivoting the fixture toward and/or over the building, where the service technician services the fixture.

Finally, it is an object to provide a method of servicing a fixture mounted to a building by providing a mount for mounting the interface subassembly such that, in installations where the bracket can readily be reached, the interface subassembly and the fixture can be readily dismounted from the bracket as a unitary subassembly, and displaced onto the roof or other safe working area.

SUMMARY OF THE DISCLOSURE

Some of the objects are obtained in a first set of embodiments comprising a bracket adapted to be mounted along a wall of a building, for mounting a fixture to the wall, the bracket comprising a wall mount subassembly to be mounted to the wall, the wall mount subassembly comprising a body member having a first side for being disposed outwardly away from the wall, and a second side for being disposed inwardly toward the wall; an interface subassembly adapted for serving as an interface between the wall mount subassembly and a fixture holder, the interface subassembly comprising (i) an interface plate configured to receive and hold the fixture holder, to be secured to the wall mount subassembly, and to subsequently be removed from the wall mount subassembly while holding the fixture holder, and (ii) holding means for holding the fixture holder to the interface subassembly; and securing means for securing the interface subassembly to the wall mount subassembly, the bracket being configured to interface with, and thereby to hold, the fixture holder along a sufficient length of the fixture holder that the bracket provides both primary load bearing support to the fixture holder, and primary directional support to hold the fixture holder in a given attitude.

In some embodiments, the bracket includes a fixture holder, as a separate element, removably secured to the interface plate by the holding means.

The bracket is typically adapted to be mounted in an upstanding attitude along an upstanding wall of the building, the wall mount subassembly including load-bearing spacing apparatus, such as spacing legs, for bearing the weight of the interface plate, the fixture holder, and the fixture, and for spacing the body member from the wall of the building, by a distance of at least 2 inches, preferably at least 6 inches. In some embodiments, the spacing is preferably measured with respect to the interface plate, wherein the spacing apparatus spaces the interface plate from the wall of the building, by a distance of at least 3 inches.

Preferably, the body member comprises a first surface, on the first side of the body member, for receiving the fixture holder against the first side of the body member, and a second opposing surface on the second side of the body member, the interface plate having an outwardly facing surface displaced outwardly from a surface defined by the second surface of the body member, the bracket including an adjuster for adjusting the attitude of the fixture holder to be received in the bracket, relative to the body member.

In preferred embodiments, the body member comprises a first surface, on the first side of the body member, for receiving the fixture holder against the first side of the body member, and a second opposing surface on the second side of the body member, the interface plate being mounted to the body member by the securing means, being adapted for pivoting with respect to the body member, and thereby having an axis of pivotation, about the securing means, disposed inwardly of the second side of the body member. Preferably, the body member has a length, a top, and a bottom, and the axis of pivotation is above the bottom of the body member. The securing means is preferably disposed in a plane extending transverse to the length of the body member, and the holding means is adapted to provide securement between the fixture holder and the interface subassembly on both sides of the plane. Preferably, the interface plate has opposing first and second ends, and a length between the first and second ends and extends in a direction the length of the body member, and the axis of pivotation is located about midway between the first and second ends of the interface plate, and is disposed transverse to the length of the interface plate, whereby the weight of the interface plate is somewhat balanced with respect to the axis of pivotation when the interface plate is disposed in a horizontal attitude.

Preferably, an outwardly disposed surface of the interface plate substantially comprises an extension of at least one element of the body member, whereby the bracket can receive an elongated portion of the fixture holder along combined lengths of the at least one element of the body member and the outwardly disposed surface of the interface plate. Typically, an outwardly disposed surface of the interface plate substantially comprises an offset extension of at least one element of the body member, whereby the bracket can receive an elongated portion of the fixture holder along combined lengths of the at least one element of the body member and the outwardly disposed surface of the interface plate, and including an adjuster on the body member, or the interface plate, for adjusting the attitude of the fixture holder to be received in the bracket, relative to the corresponding interface plate or body member.

In preferred structure, the holding means holds the fixture holder to the interface subassembly adjacent the axis of pivotation, whereby upon pivotation of the fixture holder, a point on the fixture holder which is closest to the axis of pivotation describes an arc having a radius no greater than one inch, about the axis of pivotation.

Also in preferred structure, the securing means comprises a pivot bolt which is preferably disposed in a horizontal attitude when the bracket is mounted in a vertical attitude on the wall of the building. The pivot bolt may be disposed in a variety of other attitudes, depending on the structures of the elements of the hinge.

The preferred embodiments of the bracket include an interface lock for locking the combination of the fixture holder and the interface subassembly into the bracket.

In a second set of embodiments, the invention comprehends a method of mounting a fixture to a wall of a building, using a bracket comprising a wall mount subassembly to be mounted to the wall, and an interface subassembly to be mounted to the wall mount subassembly, the wall mount subassembly comprising a body member, the interface subassembly being adapted for serving as an interface between the wall mount subassembly and a fixture holder, the interface subassembly comprising (i) an interface plate, configured to receive and hold the fixture holder, to be secured to the wall mount subassembly, and to subsequently be removed from the wall mount subassembly while holding the fixture holder, (ii) holding means for holding the fixture holder to the interface subassembly; and (iii) securing means for securing the interface subassembly to the wall mount subassembly, the bracket being configured to interface with, and thereby to hold, the fixture holder along a sufficient length of the fixture holder that the bracket provides both primary load support to the fixture holder, and primary directional support to hold the fixture holder in a given attitude, the method comprising the steps of mounting the wall mount subassembly to the wall; and mounting the fixture to the wall mount subassembly, and thus to the wall, through the interface subassembly, whereby the bracket provides both primary load-bearing support to transfer the weight of the fixture and the fixture holder to the wall, and primary directional support to hold the fixture and the fixture holder in a given attitude.

In some embodiments, the method of mounting a fixture to the wall preferably includes mounting the fixture to the fixture holder before mounting the fixture holder to the wall mount subassembly. In other embodiments, the method includes mounting the fixture holder to the wall mount subassembly before mounting the fixture to the fixture holder. The fixture may be mounted to the interface subassembly either before or after mounting the interface subassembly to the Wall mount subassembly.

In a third set of embodiments, the invention comprehends a method of servicing a fixture, the fixture being mounted to a wall of a building using a bracket, a fixture holder being mounted to the bracket, the bracket comprising a wall mount subassembly mounted to the wall, and an interface subassembly mounted to the wall mount subassembly, the wall mount subassembly comprising a body member, and an interface lock locking the combination of the fixture holder and the interface subassembly against the bracket, the interface subassembly being adapted for serving as an interface between the wall mount subassembly and the fixture holder, the interface subassembly comprising (i) an interface plate, receiving and holding the fixture holder, and adapted to subsequently be removed from the wall mount subassembly while holding the fixture holder, (ii) holding means holding the fixture holder to the interface subassembly; and (iii) securing means securing the interface subassembly to the wall mount subassembly, the bracket interfacing with, and thereby holding, the fixture holder along a sufficient length of the fixture holder that the bracket provides both primary load support to the fixture holder, and primary directional support holding the fixture holder in a given attitude, the method comprising the steps of releasing the interface lock, and thereby releasing the combination of the fixture holder and the interface subassembly from the locking against the bracket provided by the interface lock; and pivoting the fixture holder and the interface subassembly with respect to the wall mount subassembly while the holding means holds the fixture holder to the interface subassembly.

The method of servicing the fixture preferably includes moving at least a portion of the fixture, by pivotation, toward and/or over a portion of the building adapted to receive a service worker.

Finally, the invention comprehends a method of servicing a fixture, including the step of removing the combination of the interface plate and the fixture holder from the wall mount subassembly while the fixture holder is held to the interface plate by the holding means. Typically, the interface plate, the fixture holder, and the fixture are removed from the wall mount subassembly, as a single integral unit.

DETAILED DESCRIPTION OF THE ILLUSTRATED EMBODIMENTS

Figure 1:
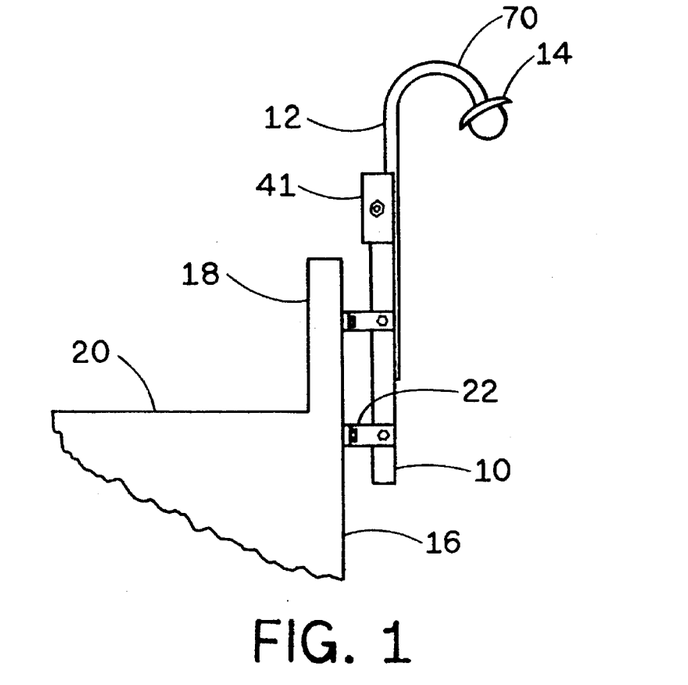
FIG. 1 is a fragmentary elevation of a building, showing a bracket of the invention holding a light fixture.

Turning now to the drawings, FIG. 1 shows a bracket 10 holding a fixture holder 12 and corresponding fixture 14, secured to a building 16, including on parapet 18 about a flat roof 20. The bracket is mounted to and spaced from the building by legs 22.

Figure 2:
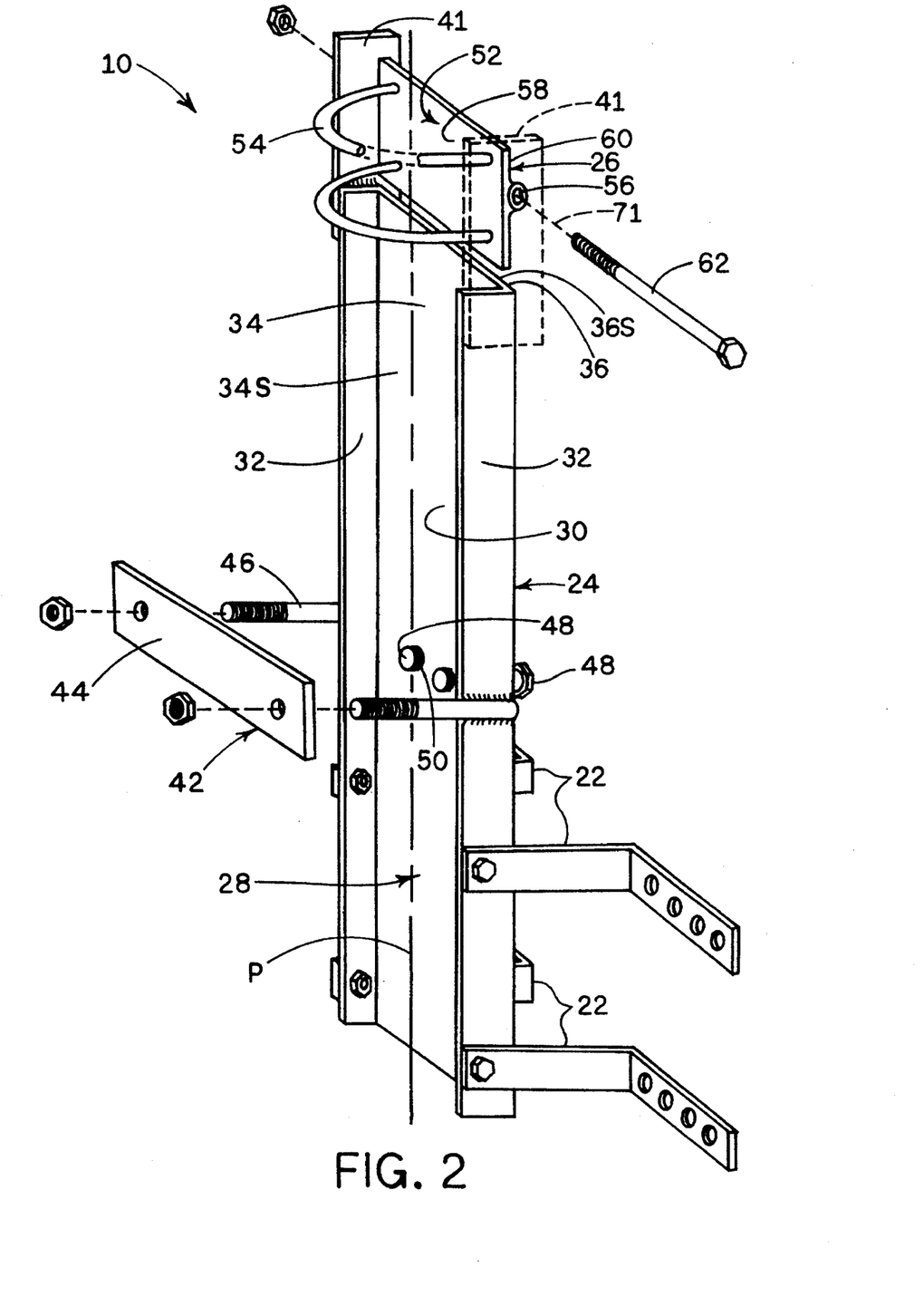
FIG. 2 is a pictorial view of a bracket of the invention, with parts in exploded view, and parts shown in dashed outline.
Figure 3:
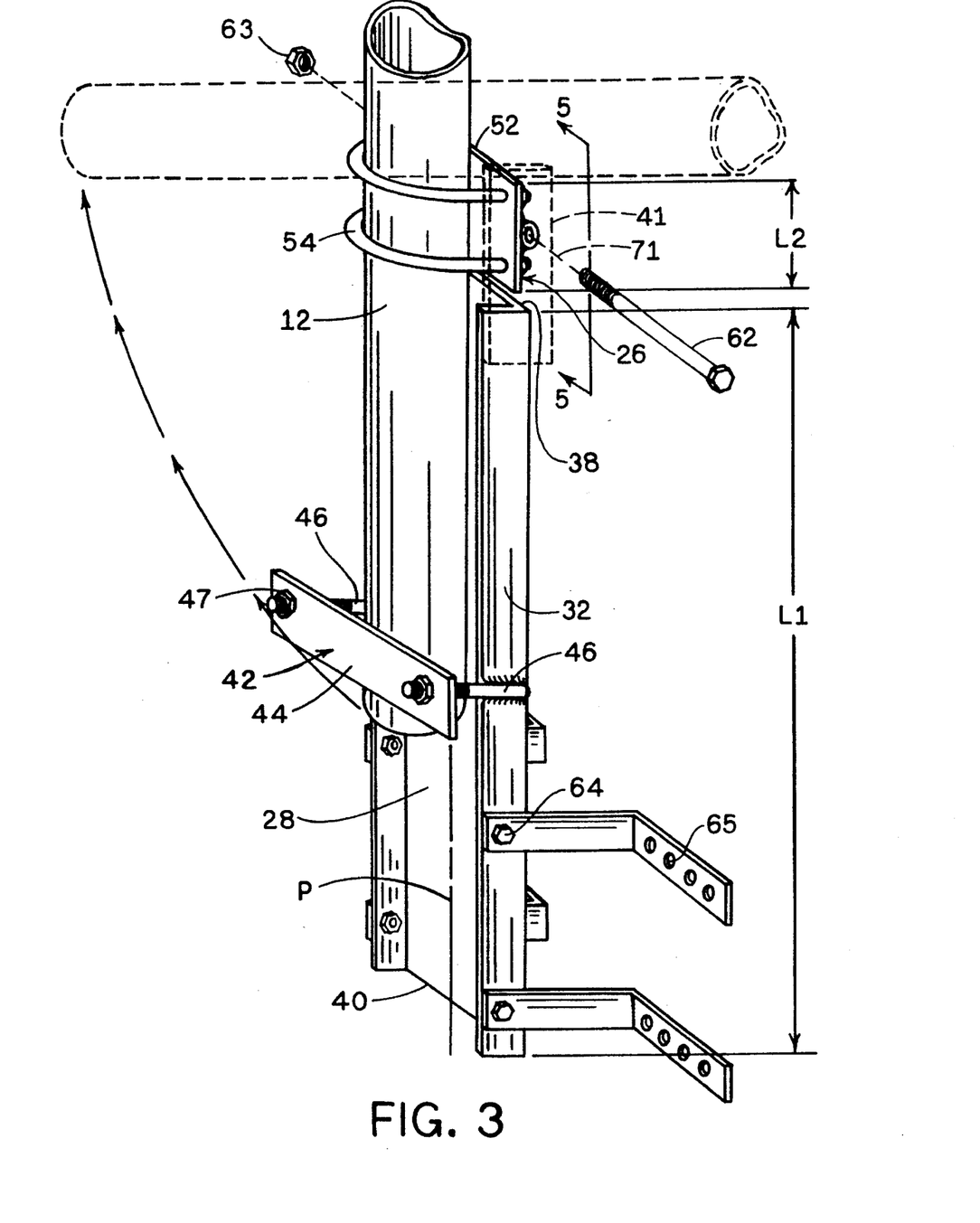
FIG. 3 is a pictorial as in FIG. 2, and including a fragment of a fixture holder shown in the secured position, and in dashed outline in the pivoted position.

Turning now to FIGS. 2 and 3, the bracket 10 generally comprises a wall mount subassembly 24 and an interface subassembly 26. The wall mount subassembly 24 includes a body member 28, comprised of an elongated central web 30 and a pair of flanges 32 on either side of the central web. The body member 28 has a first outer side 34, and including a first surface 34S, for being disposed outwardly away from the wall of the building, and a second inner side 36, and including a second surface 36S, for being disposed inwardly toward the wall. The first surface 34S and flanges 32 define a path P for receiving the fixture holder 12.

The body member 28 further has a length "L1," a top 38, and a bottom 40. A pair of extension arms 41, on body member 28, extend upwardly from the top 38 of the body member 28.

Fixture holder clamp or interface lock 42 comprises a clamp plate 44 mounted to a pair of clamp bolts 46 by nuts 47, bolts 46 being welded to the corresponding flanges 32. A pair of adjusting bolts 48 extend through threaded holes 50 in the body member 28, adjacent fixture holder clamp 42.

Figure 5:
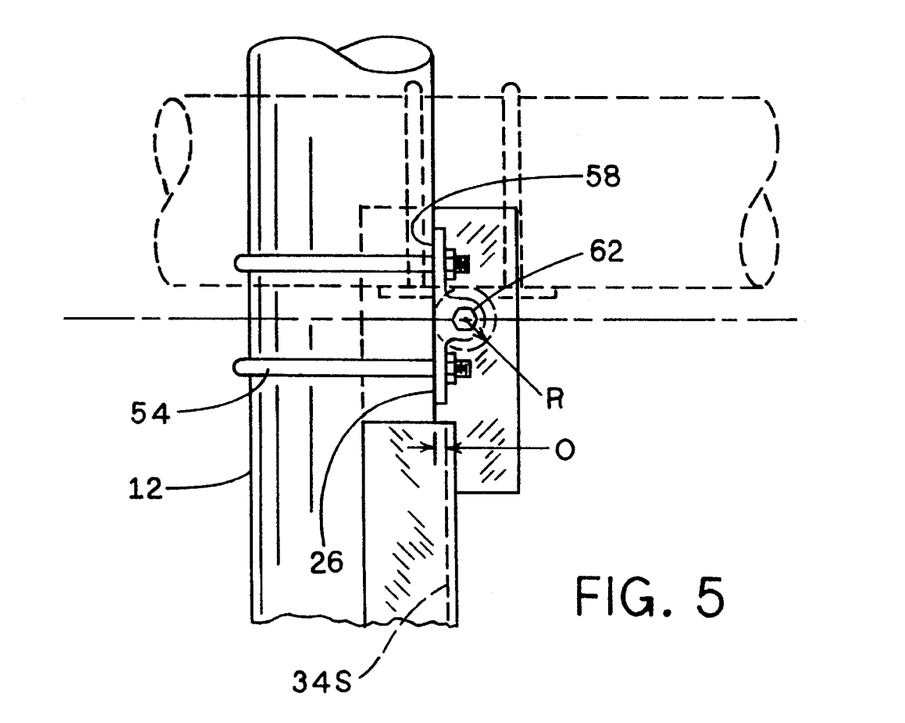
FIG. 5 shows an enlarged fragmentary elevation view of the interface assembly taken at 5—5 of FIG. 3.

The interface subassembly 26 includes an interface plate 52, U-bolts 54, and bore 56, disposed generally intermediate between U-bolts 54. Interface plate 52 has an outwardly facing surface 58, preferably offset outwardly from the first surface 34S of the body member. The offset is shown as "O" in FIG. 5. Bore 56 is secured to the interface plate on its inwardly facing surface 60, and is aligned with holes (not shown) through the corresponding extension arms 41. U-bolts or retainer 54 extend through the interface plate, and about the fixture holder 12, securing and retaining the fixture holder to the interface plate.

The interface plate 52 has a length "L2" generally extending in a direction corresponding to the length "L1" of the body member, such that the interface plate serves as a substantial extension of the outer surface 34S of the body member, albeit offset from the body member by the offset distance "O."

Interface subassembly 26 is secured to the wall mount subassembly 24 by pivot bolt 62, which extends through bore 56 and the holes through extension arms 41.

The bracket 10 is used as follows. Typically the interface subassembly 26 is initially separated from the wall mount subassembly 24. Legs 22 are secured to the body member 28 by leg bolts 64. The wall mount subassembly is mounted to the building using conventional wall anchors through holes 65 in the legs. The interface subassembly is then secured to the wall mount subassembly by aligning bore 56 with the holes in the extension arms 41 and inserting pivot bolt 62 through the extension arms and bore 56, and securing a nut 63 on the distal end of the bolt.

With the interface subassembly secured to the wall mount subassembly, and with U-bolts 54 loosened, a pipe or other suitable fixture holder 12 is inserted between the U-bolts 54 and interface plate 52, and advanced along the path P at the outer surface 34S of the body member 28 and to clamp 42. Since the body member is generally disposed close to the edge of the roof when the wall mount subassembly is mounted on the building wall, the worker need not reach out very far over empty space to insert the fixture holder. The fixture holder 12 is then removably secured to the bracket 10 by tightening the U-bolts 54. Clamp 42 can also be tightened about the fixture holder at this time. Clamp 42 is tightened by tightening nuts 47 against plate 44.

As used herein, "removably secured," means that the element referred to is securely mounted such that it will dependably support the function relied on, but can be "removed" by releasing typical reversible fasteners such as bolts or the like. It does not comprehend more permanent securements such as welds.

Typically, however, the fixture holder remains released from clamp 42 until after the fixture is installed. The interface assembly, with fixture holder 12 held therein, is pivoted about pivot bolt 62, such that the distal end 70 of the fixture holder is over the roof 20 of the building. If the building includes a surrounding parapet 18, typically, the distal end 70 of the fixture holder will be inside the outline of the parapet. In this disposition, the fixture can be easily installed by the worker, over the roof. The bracket is shown with the distal end of the fixture holder disposed over the roof, and with the fixture installed, in FIG. 4.

Once the fixture is installed on the fixture holder, the fixture, fixture holder, and interface assembly are pivoted back into an upright orientation as shown in FIG. 1, with the lower end of the fixture holder disposed against the outer surface 34S of the body member as shown in FIGS. 1 and 3. With the fixture holder disposed against the outer surface 34S, clamp 42 is clamped against the fixture holder, by emplacing plate 44 over the fixture holder as shown in FIG. 3, and tightening the nuts 47 over the plate. As clamp 42 is being secured, adjusting bolts are adjusted, through the central web 30, to extend a greater or lesser distance from the central web, in order to adjust the angle of the fixture holder with respect to the ground or the building, as desired. Thus can the upright attitude of the fixture holder and fixture be adjusted relative to the wall mount subassembly by making adjustments on the wall mount subassembly.

The outer surface 58 of the interface plate is typically essentially an extension of the receiving function of the outer surface 34S of the central web 30. However, generally, the outer surface 58 is offset slightly outwardly the distance "O" from the plane of the surface 34S, to increase the scope of the angular adjustment that can be achieved by making adjustments at adjusting bolts 48. See FIG. 5.

Fixture holder 12, and accordingly, fixture 14, is held to the bracket 10 by two spaced clampings. A lower portion of the fixture holder is held to the bracket by fixture holder clamp 42. Higher up on the fixture holder, U-bolts 54 hold the fixture holder to the interface subassembly 26. The spacing of the holdings of clamp or interface lock 42 and retainer or U-bolts 54 holds the fixture holder along a sufficient portion of its length that the bracket, through the central web and the interface assembly, and pivot bolt 62, in combination, and along lengths L1 and L2, provides both primary load bearing support and primary directional support to hold the fixture holder in a given attitude (orientation), for example a generally upright or vertical attitude.

Conventional electrical connections can be made between the fixture and the building power supply, and disconnected, at any time based on conventional analysis.

With adjustments having been made by adjusting bolts 48, with clamp 42 secured, and with pivot bolt 62 installed, the fixture holder is securely held to the bracket for an indefinite period while the fixture is in use. FIG. 1.

Figure 4:
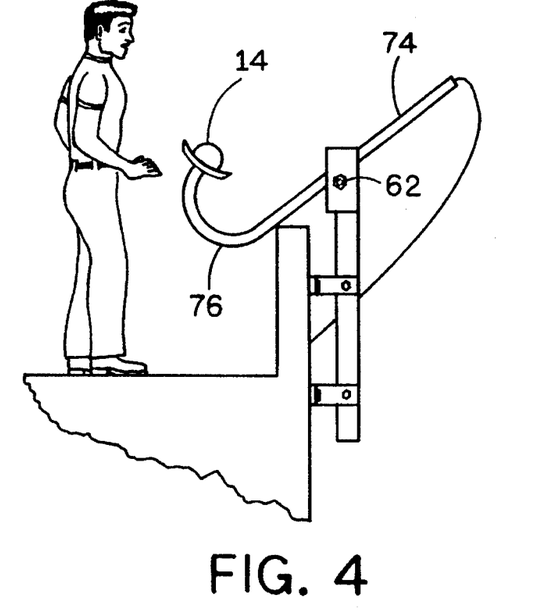
FIG. 4 shows the fragmentary elevation as in FIG. 1, including a service technician, with the light fixture pivoted over the building parapet and roof.

When the fixture is to be serviced, the clamping procedure is generally reversed. With the worker standing e.g. on the roof, clamp 42 is released. The fixture holder and fixture can then be pivoted over the building as shown in FIG. 4. The service worker can then do his work without reaching out from the roof.

While the worker does reach off the roof to release clamp 42, the clamp is directly adjacent the edge of the roof, whereby the danger is quite minimal.

Pivot bolt 62 serves as the axis of pivotation, whereby the interface subassembly, and any accompanying fixture holder and fixture, pivot with respect to wall mount subassembly 24. As shown, pivot bolt, along with the axis of pivotation is disposed inwardly from the fixture holder, and thus inwardly from surface 34S. Thus it avoids the negative affects of passing the pivot bolt through the fixture holder. However, the axis of pivotation is close to the fixture holder thereby facilitating a generally pivoting motion with respect to the fixture holder, rather than having the fixture holder describe a large arc about the pivot axis. In general, as the fixture holder pivots about the axis of pivotation, the point on the fixture holder which is closest to the axis of pivotation describes an arc having a radius "R" (FIG. 5) no greater than two inches, preferably no greater than one inch. Of course, the smaller the arc, the more stable the assembly during the pivoting operation.

Preferably, fixture holder 12 extends far enough below pivot bolt 62 that the weight of the lower portion 74 of the fixture holder generally serves as a counterbalance to the combined weight of the upper portion 76 of the fixture holder and the fixture. Thus, as the fixture and fixture holder are pivoted about pivot bolt 62, the bracket supports the weight of the fixture, the fixture holder, and the interface subassembly; and the pivoting of the fixture either toward or away from the building is accomplished with modest effort relative to the weight being moved. In general, however, the "rest" position of the assembly is the vertical position shown in FIG. 1.

When the bracket 10 is mounted in a vertical attitude on the building, the pivot bolt is typically disposed in a horizontal position. However, other absolute and relative orientations can be worked out for various applications, now that the basic concepts of the pivotation are disclosed herein, and all such absolute and relative orientations are contemplated herein.

Without the pivoting or other features disclosed herein, the worker generally must work on the fixture in the orientation shown in FIG. 1, reaching farther away from the safety of the roof, along with the accompanying hazards.

The installation of the bracket and fixture is described above in terms of the interface subassembly being installed before the fixture and fixture holder are installed to the interface subassembly. As an alternative, the fixture holder can be mounted to the interface subassembly before the interface subassembly is installed on the wall mount subassembly.

Figure 6:
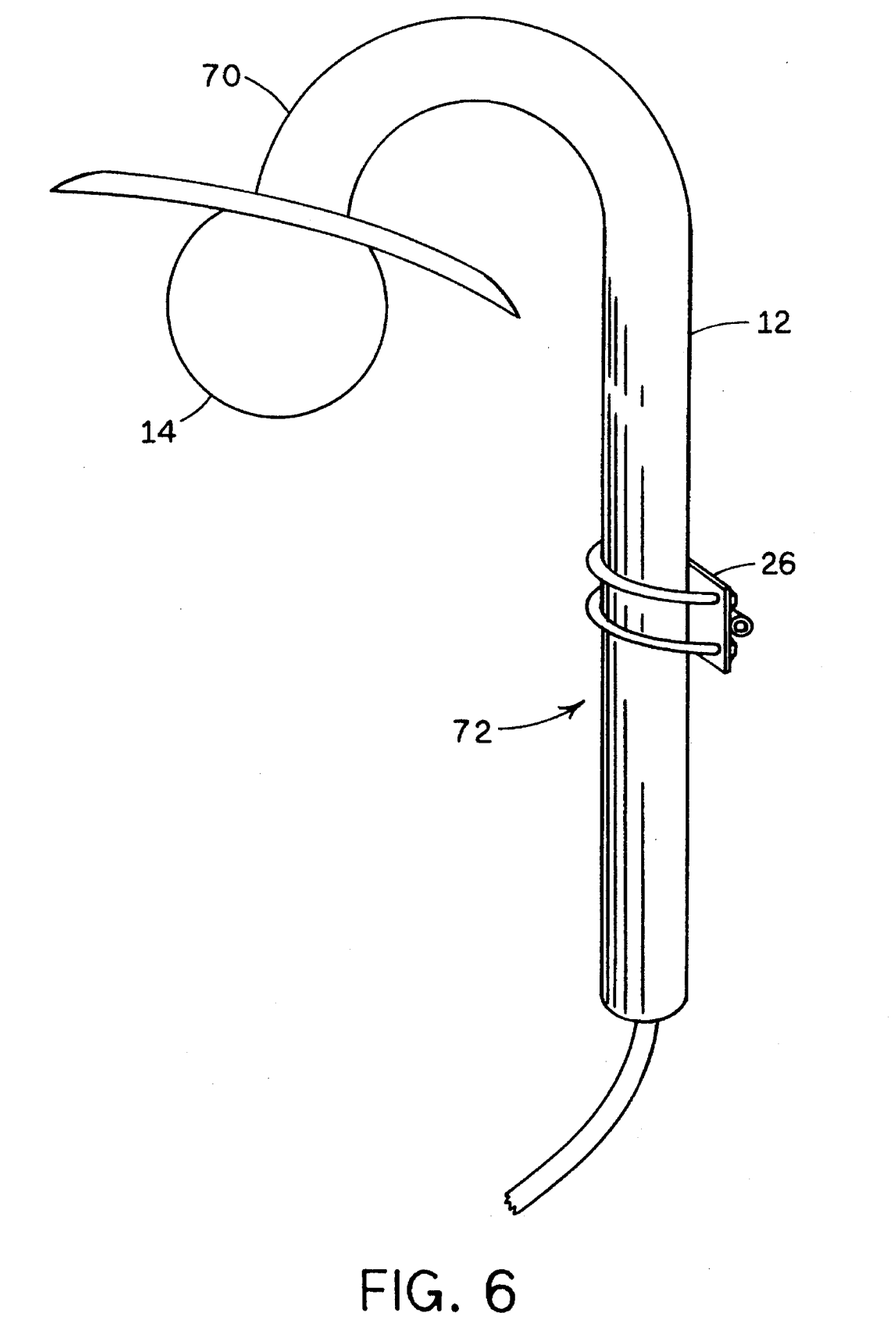
FIG. 6 shows a pictorial view of the interface assembly of the invention holding the fixture, and correspondingly, the fixture holder, separate from the rest of the bracket.

Similarly, the fixture itself can be mounted to the fixture holder before the fixture holder is mounted to the interface assembly, without regard for whether the fixture holder is mounted to the interface subassembly before or after the interface subassembly is mounted to the wall mount subassembly. Accordingly, a fixture/interface subassembly 72, including the fixture 14, the fixture holder 12, and interface subassembly 26, can be assembled separate from the wall mount subassembly, and installed and/or serviced as a separate element of the bracket/fixture combination. To wit, fixture/interface subassembly 72 can be put together, and installed on the wall mount subassembly as a unit. Similarly, the subassembly 72 can be removed from the bracket as a unit, for servicing or replacement.

Fixture holder 12 generally serves as a link between the fixture and the bracket. Below pivot bolt 62, the fixture holder and bracket are secured to each other. Above pivot bolt 62, the fixture holder and the fixture are secured to each other. In some cases, the fixture as supplied may include suitable linking apparatus for securement to the bracket. In such cases, no additional fixture holder need be used. Accordingly, the teaching herein of both a fixture holder and a fixture comprehends the fixture holder as being that part of the fixture which serves as the link to the bracket, including cases where the fixture holder is an integral part of the fixture.

The teaching hereinabove refers to installing the bracket on a "wall" of a building. The term "wall" as used herein is defined liberally to include any structural portion of the building, interior or exterior, capable of supporting the bracket and fixture.

For working on or with the brackets of the invention, the worker works or stands on a portion of the building which is adapted to receive the worker. This may be a horizontal or sloping roof. It includes any other surface where the worker can safely stand, sit, or kneel, or otherwise safely stay while working on the fixture generally over that surface occupied by the worker. In general, acceptable working surfaces are those where the worker can work on the fixture without taking undue risk by reaching out from the surface occupied by the worker.

The term "servicing" a fixture refers to any manipulation of the fixture after the initial installation of the fixture, including removal or replacement of all or part of the fixture, or the fixture holder.

The bracket of the invention has been described herein with respect to installation on a vertical wall. By turning the bracket such that the "top" 38 is disposed downwardly, and the "bottom" 40 is disposed upwardly, and by mounting the legs 22 on or adjacent "top 38," the bracket can be used in an "upside down" orientation for mounting the application in a vertical attitude on a horizontal surface (e.g. a flat roof) or for mounting the application on the inside, or across the top, of the parapet 18. In such application, the "fixture holder" extends from the "bottom 40" of the bracket toward the fixture.

Similarly, with the fixture holder extending from the bottom 40 of the bracket, toward the fixture, the bracket is readily applied to applications where the fixture holder extends in a non-vertical attitude, such as horizontally, from the locus where the bracket is mounted to the building, toward the fixture.

Figure 7:
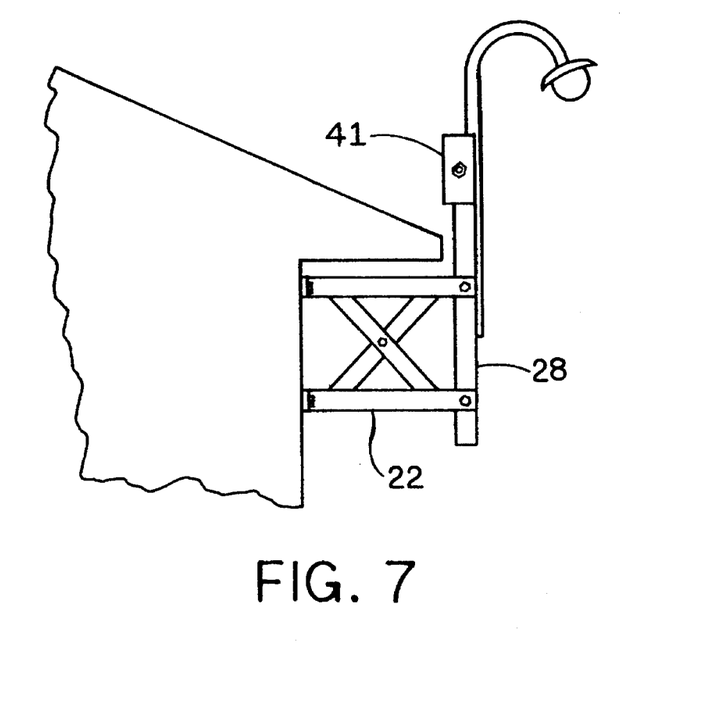
FIG. 7 shows a fragmentary elevation view as in FIG. 1, but showing the legs spacing the bracket from the building a sufficient distance that the main body member extends beyond the roof overhang.

As seen in FIG. 7, the invention comprehends that the legs 22 can be elongated such that the legs space the body member, and correspondingly the fixture beyond a typical roof overhang. Thus, the bracket can be mounted below the roof, while the fixture extends above the roof line, without cutting a hole in the roof. In such applications, pivot bolt 62 is preferably above the edge of the roof. With pivot bolt 62 above the roof, the pivot feature can be used to pivot the fixture over the roof in the same manner as shown in FIG. 4.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A bracket adapted to be mounted along a wall of a building, for thus mounting a fixture to the wall, said bracket comprising:
   (a) a wall mount subassembly to be mounted to the wall, said wall mount subassembly comprising a body member having a first side for being disposed outwardly away from the wall, a second side for being disposed inwardly toward the wall, and a path for receiving an elongate fixture holder therealong;
   (b) an interface subassembly mounted to said wall mount subassembly, serving as an interface between said wall mount subassembly and the elongate fixture holder, said interface subassembly comprising (i) an interface plate having a first holder mounted thereto and mounting the fixture holder to said interface plate;
   (c) a second holder spaced from said interface plate, holding the elongate fixture holder to said wall mount subassembly and immobile along the path; and
   (d) securing apparatus securing said interface subassembly to said wall mount subassembly,
said bracket being configured such that said first and second holders hold the fixture holder to the bracket at respective spaced locations such that the first and second spaced holders cooperate in providing primary directional support to hold the fixture holder in a given attitude.

2. A bracket as in claim 1 and including a fixture holder, as a separate element, removably secured to said interface plate by said first holder.

3. A bracket as in claim 2 and including an interface lock for locking the combination of said fixture holder and said interface subassembly into said bracket.

4. A bracket as in claim 1, said bracket being adapted to be mounted in an upstanding attitude along an upstanding wall of the building, said wall mount subassembly including load-bearing spacing apparatus, for bearing the weight of said interface plate, the fixture holder, and the fixture, and for spacing said body member from the wall of the building, by a distance of at least 2 inches.

5. A bracket as in claim 1, said bracket being adapted to be mounted in an upstanding attitude along an upstanding wall of the building, said wall mount subassembly including load-bearing spacing apparatus, for bearing the weight of said interface plate, the fixture holder, and the fixture, and for spacing said body member from the wall of the building, by a distance of at least 6 inches.

6. A bracket as in claim 1, said bracket being adapted to be mounted in an upstanding attitude along an upstanding wall of the building, said wall mount subassembly including load-bearing spacing apparatus, for bearing the weight of said interface plate, the fixture holder, and the fixture, and for spacing said interface plate from the wall of the building, by a distance of at least 3 inches.

7. A bracket as in claim 1, said body member comprising a first surface, on said first side of said body member, for receiving the fixture holder against said first side of said body member, and a second opposing surface on said second side of said body member, said interface plate having an outwardly facing surface displaced outwardly from a surface defined by said second surface of said body member, and including an adjuster for adjusting the attitude of the fixture holder to be received in said bracket, relative to said body member.

8. A bracket as in claim 1, said body member comprising a first surface, on said first side of said body member, for receiving the fixture holder against said first side of said body member, and a second opposing surface on said second side of said body member, said interface plate being mounted to said body member by said securing means, being adapted for pivoting with respect to said body member, said interface subassembly thereby having an axis of pivotation, about said securing means, disposed inwardly of said first side of said body member.

9. A bracket as in claim 8, said body member having a length, a top, and a bottom, said axis of pivotation being above said bottom of said body member.

10. A bracket as in claim 9, said securing means being disposed in a plane extending transverse to said length of said body member, said first holder being adapted to provide securement between the fixture holder and said interface subassembly on both sides of said plane.

11. A bracket as in claim 9, said interface plate having opposing first and second ends, and a length between said first and second ends and extending in a direction along the length of said body member, said axis of pivotation being located about midway between said first and second ends of said interface plate, and being disposed transverse to said length of said interface plate, whereby the weight of said interface plate is somewhat balanced with respect to said axis of pivotation when said interface plate is disposed in a horizontal attitude.

12. A bracket as in claim 1 wherein, when said interface plate is secured to said wall mount subassembly, an outwardly disposed surface of said interface plate substantially comprises an extension of at least one element of said body member, whereby said bracket can receive an elongated portion of the fixture holder along combined lengths of said at least one element of said body member and said outwardly disposed surface of said interface plate.

13. A bracket as in claim 12 wherein said first holder holds said fixture holder to said interface subassembly adjacent said axis of pivotation, whereby upon pivotation of the fixture holder, a point on the fixture holder which is closest to the axis of pivotation describes an arc having a radius no greater than one inch about said axis of pivotation.

14. A bracket as in claim 1 wherein, when said interface plate is secured to said wall mount subassembly, an outwardly disposed surface of said interface plate substantially comprises an offset extension of at least one element of said body member, whereby said bracket can receive an elongated portion of the fixture holder along combined lengths of said at least one element of said body member and said outwardly disposed surface of said interface plate, and including an adjuster on one of said interface plate and said body member for adjusting the attitude of the fixture holder, to be received in said bracket, relative to said one of said interface plate and said body member.

15. A bracket as in claim 1 wherein said securing means comprises a pivot bolt, and wherein said pivot bolt is disposed in a horizontal attitude when said bracket is mounted in a vertical attitude on the wall of the building.

16. A bracket as in claim 1 and including an interface lock for locking the combination of the fixture holder and said interface subassembly into said bracket.

17. A bracket adapted to be mounted along a wall of a building, for thus mounting a fixture to the wall, said bracket comprising:

(a) a wall mount subassembly to be mounted to the wall, said wall mount subassembly comprising a body member having a first side for being disposed outwardly away from the wall, and a second side for being disposed inwardly toward the wall said body member comprising a first surface, on said first side thereof, for receiving and supporting the fixture thereagainst;

(b) an interface subassembly adapted for serving as an interface between said wall mount subassembly and the fixture, said interface subassembly comprising (i) an interface plate configured to receive and hold the fixture, and to be secured to said wall mount subassembly, and (ii) holding means for holding the fixture to said interface subassembly; and (c) securing means securing said interface subassembly to said wall mount subassembly, said bracket being configured to interface with, and thereby to hold, the fixture along a sufficient length of the fixture that said bracket provides both primary load bearing support to the fixture, and primary directional support to hold the fixture in a given attitude.

18. A bracket as in claim 17 and including a fixture, as a separate element, removably secured to said interface plate by said holding means.

19. A bracket as in claim 17, said bracket being adapted to be mounted in an upstanding attitude along an upstanding wall of the building, said wall mount subassembly including loadbearing spacing apparatus, for bearing the weight of said interface plate and the fixture, and for spacing said body member from the wall of the building, by a distance of at least 2 inches.

20. A bracket as in claim 17, said interface plate having an outwardly facing surface displaced outwardly from said first surface, and including an adjuster for adjusting the attitude of the fixture to be received in said bracket, relative to said body member.

21. A bracket as in claim 17, said interface plate being mounted to said body member by said securing means, being adapted for pivoting with respect to said body member, and having an axis of pivotation, about said securing means, disposed inwardly of said first surface.

22. A bracket as in claim 17 wherein, when said interface plate is secured to said wall mount subassembly, an outwardly disposed surface of said interface plate substantially comprises an extension of at least one element of said body member, whereby said bracket can receive an elongated portion of the fixture along combined lengths of said at least one element of said body member and said outwardly disposed surface of said interface plate.

23. A bracket adapted to be mounted along a wall of a building, for thus mounting a fixture to the wall, said bracket comprising:

(a) a wall mount subassembly to be mounted to the wall, said wall mount subassembly comprising a body member having a first side for being disposed outwardly away from the wall, and a second side for being disposed inwardly toward the wall, said body member comprising a first surface, on said first side thereof, for receiving the fixture holder thereagainst such that said first surface is between the fixture and the building;

(b) an interface subassembly, for securement to said wall mount subassembly, and for serving as an interface between said wall mount subassembly and the fixture holder.

24. A bracket as in claim 23, said interface subassembly comprising (i) an interface plate configured to receive and hold the fixture holder, to be secured to said wall mount subassembly, and to subsequently be removed from said wall mount subassembly while holding the fixture holder, and (ii) a holder for holding the fixture holder to said interface subassembly.

25. A bracket as in claim 24 and including the fixture holder as a separate element of said bracket, removably secured to said interface plate by said holding means.

26. A bracket as in claim 24, said interface plate having an outwardly facing surface displaced outwardly from a surface defined by said first surface of said body member, and including an adjuster on at least one of said body member and said interface plate for adjusting the attitude of the fixture holder to be received in said bracket, relative to said at least one of said body member and said interface plate.

27. A bracket as in claim 24, including securing means for securing said interface subassembly to said wall mount subassembly, said interface plate being mounted to said body member by said securing means, being adapted for pivoting with respect to said body member, said interface subassembly thereby having an axis of pivotation, about said securing means, disposed inwardly of said first surface of said body member.

28. A bracket as in claim 27, said body member having a top and a bottom, said axis of pivotation being above said bottom of said body member.

29. A method of mounting a fixture to a wall of a building, using a bracket comprising a wall mount subassembly to be mounted to the wall, an interface subassembly and securing apparatus securing the interface subassembly to the wall mount subassembly, the wall mount subassembly comprising a body member, the interface subassembly serving as an interface between the wall mount subassembly and a fixture holder, the interface subassembly comprising (i) an interface plate, configured to receive and hold the fixture holder, and to be secured to the wall mount subassembly, and (ii) a first holder for holding the fixture holder to the interface subassembly the method comprising the steps of:

(a) mounting the wall mount subassembly to the wall; and (b) mounting the fixture to the wall mount subassembly, and thus to the wall, (i) through the interface subassembly, and (ii) through a second holder spaced from the interface subassembly and holding the fixture holder to the wall mount subassembly along a path, the bracket providing both primary load-bearing support to transfer the weight of the fixture and the fixture holder to the wall, and primary directional support to hold the fixture and the fixture holder in a given attitude.

30. A method as in claim 29 and including, mounting the fixture to the fixture holder before mounting the fixture holder to the wall mount subassembly.

31. A method as in claim 29 and including, mounting the fixture holder to the wall mount subassembly before mounting the fixture to the fixture holder.

32. A method as in claim 29 and including, mounting the fixture to the interface subassembly before mounting the interface subassembly to the wall mount subassembly.

33. A method as in claim 29 and including, mounting the interface subassembly to the wall mount subassembly before mounting the fixture to the interface subassembly.

34. A method of servicing a fixture, the fixture being mounted to a wall of a building using a bracket, an elongate fixture holder being mounted to the bracket, the bracket comprising a wall mount subassembly mounted to the wall, an interface subassembly mounted to the wall mount subassembly, and securing apparatus securing the interface subassembly to the wall mount subassembly, the wall mount subassembly comprising a body member, and an interface lock locking the elongate fixture holder against the wall mount subassembly, the interface subassembly serving as an interface between the wall mount subassembly and the elongate fixture holder, the interface subassembly comprising (i) an interface plate having first and second sides, and a first surface on the first side thereof, the first side receiving and holding the fixture holder, and (ii) a retainer, spaced from the interface lock, and holding the elongate fixture holder to the first side of the interface plate, the method comprising the steps of:

(a) releasing the interface lock, and thereby releasing the combination of the elongate fixture holder and the interface subassembly from the locking against the wall mount subassembly provided by the interface lock; and (b) after releasing the interface lock, pivoting the combination of the elongate fixture holder and the interface subassembly with respect to the wall mount subassembly about an axis of pivotation while the retainer retains the elongate fixture holder on the interface plate, and thus retains mounting of the fixture holder to the building while the fixture is being serviced.

35. A method as in claim 34 and including moving at least a portion of the fixture, by pivotation, over a portion of the building adapted to receive a service worker.

36. A method of servicing a fixture, the fixture being mounted to a building using a bracket, a fixture holder being mounted to the bracket, the bracket comprising a wall mount subassembly mounted to the building; and an interface subassembly mounted to the wall mount subassembly, the wall mount subassembly comprising a body member, and an interface lock locking the combination of the fixture holder and the interface subassembly against the bracket, the interface subassembly being adapted for serving as an interface between the wall mount subassembly and the fixture holder, the interface subassembly comprising (i) an interface plate, receiving and holding the fixture holder, and having an axis of pivotation for pivoting the interface subassembly with respect to said wall mount subassembly, said axis of pivotation being disposed inwardly of said second side of said body member, (ii) holding means holding the fixture holder to the interface subassembly; and (iii) securing means securing the interface subassembly to the wall mount subassembly, the bracket interfacing with, and thereby holding, the fixture holder along a sufficient length of the fixture holder that the bracket provides both primary load support to the fixture holder, and primary directional support holding the fixture holder in a given attitude, said method comprising the steps of:

(a) releasing the interface lock, and thereby releasing the combination of the fixture holder and the interface subassembly from the locking against the bracket provided by the interface lock; and (b) pivoting the fixture holder and the interface subassembly with respect to the wall mount subassembly, and thereby moving the fixture toward the building.

37. A method as in claim 36 and including moving at least a portion of the fixture, by pivotation, over a portion of the building adapted to receive a service worker.

38. A method of servicing a fixture, the fixture being mounted to a building using a bracket, a fixture holder being mounted to the bracket, the bracket comprising a wall mount subassembly mounted to the building, and an interface subassembly mounted to the wall mount subassembly, the wall mount subassembly comprising a body member, and an interface lock locking the combination of the fixture holder and the interface subassembly against the bracket, the interface subassembly being adapted for serving as an interface between the wall mount subassembly and the fixture holder, the interface subassembly comprising (i) an interface plate, receiving and holding the fixture holder, and adapted to subsequently be removed from the wall mount subassembly while holding the fixture holder, (ii) holding means holding the fixture holder to the interface subassembly; and (iii) securing means securing the interface subassembly to the wall mount subassembly, the bracket interfacing with, and thereby holding, the fixture holder along a sufficient length of the fixture holder that the bracket provides both primary load support to the fixture holder, and primary directional support holding the fixture holder in a given attitude, said method comprising the steps of:

(a) releasing the interface lock, and thereby releasing the combination of the fixture holder and the interface subassembly from the locking against the bracket provided by the interface lock; and (b) removing the combination of the interface plate and the fixture holder from the wall mount subassembly while the fixture holder is held by the interface plate.

39. A method as in claim 38 and including the step of removing the combination of the interface plate, the fixture holder, and the fixture from the wall mount subassembly while the fixture holder is held by the interface plate.

40. A fixture interface assembly, comprising:
(a) a fixture;
(b) a fixture holder having first and second ends, secured to and supporting said fixture on said first end; and
(c) an interface subassembly comprising (i) an interface plate, having first and second sides, (ii) a retainer retaining said fixture holder to said first side of said interface plate at a locus remote from said first end of said fixture holder, and oriented in a first direction and (iii) a bore on said interface subassembly adjacent said second side of said interface plate and oriented in a second direction generally transverse to said first direction and generally parallel with said first side of said interface plate, said bore being adapted to receive a pivot bolt suitable for mounting said interface subassembly into a wall mount subassembly, and for pivoting said interface subassembly about the wall mount subassembly.

41. A fixture assembly, comprising:
(a) a bracket adapted to be mounted along a wall of a building, for mounting a fixture to the wall, said bracket comprising (i) a wall mount subassembly to be mounted to the wall, said wall mount subassembly comprising a body member having a first side for being disposed outwardly away from the wall, and a second side for being disposed inwardly toward the wall, (ii) an interface subassembly adapted for serving as an interface between said wall mount subassembly and a fixture holder, said interface subassembly comprising an interface plate configured to receive and hold the fixture holder, and to be secured to said wall mount subassembly, and holding means for holding the fixture holder to said interface subassembly, and (iii) securing means for mounting said interface plate to said body member, for pivotation about said securing means and with respect to said body member;
(b) a fixture holder held to said interface subassembly; and
(c) a fixture held on a distal end of said fixture holder;
said fixture holder, when in a vertical attitude, having a lower portion extending below said securing means, and an upper portion extending above said securing means, the portion extending below said securing means serving as a counterbalance to the combined weight of said upper portion and said fixture, whereby pivoting and control of the fixture about said securing means is accomplished with no more than modest effort relative to the weight being moved.

42. A bracket adapted to be mounted along a wall of a building, for thus mounting a fixture to the wall, said bracket comprising:
(a) a wall mount subassembly to be mounted to the wall, said wall mount subassembly comprising a body member having a first side for being disposed outwardly away from the wall, and a second side for being disposed inwardly toward the wall, said body member comprising a first surface, on said first side thereof, for receiving the fixture holder against said first side;
(b) an interface subassembly adapted for serving as an interface between said wall mount subassembly and a fixture holder, said interface subassembly comprising (i) an interface plate configured to receive and hold the fixture holder, and to be secured to said wall mount subassembly, and (ii) a retainer retaining the fixture holder to said interface subassembly; and
(c) securing apparatus for securing said interface subassembly to said wall mount subassembly,
said bracket being configured to interface with, and thereby to hold, the fixture holder along a sufficient length of the fixture holder that said bracket provides primary directional support to hold the fixture holder in a given attitude.

43. A bracket as in claim 42, said interface plate having a third side for being disposed away from the wall, said interface plate being mounted to said body member by said securing apparatus, said interface subassembly having an axis of pivotation at said securing apparatus, disposed inwardly of said third side of said interface plate, and pivoting with respect to said body member.

44. A bracket as in claim 42, said interface plate having a third outwardly facing surface displaced outwardly from said first surface, and including an adjuster adjusting the attitude of the fixture holder to be received in said bracket, relative to said first surface.

45. A bracket adapted to be mounted along a wall of a building, for thus mounting a fixture to the wall, said bracket comprising:
(a) a wall mount subassembly to be mounted to the wall, said wall mount subassembly comprising a body member having a first side for being disposed outwardly away from the wall, and a second side for being disposed inwardly toward the wall, and a path for receiving an elongate fixture holder therealong;
(b) an interface subassembly adapted for serving as an interface between said wall mount subassembly and a fixture holder, said interface subassembly comprising (i) an interface plate configured to receive and hold the fixture holder, and to be secured to said wall mount subassembly, and (ii) a retainer retaining the fixture holder to said interface subassembly; and
(c) securing apparatus securing said interface subassembly to said wall mount subassembly,
said bracket being configured to interface with, and thereby to hold, the fixture holder along a sufficient length of the fixture holder that said bracket provides both primary load bearing support to the fixture holder, and primary directional support to hold the fixture holder in a given attitude.

46. A bracket adapted to be mounted along a wall of a building, for thus mounting a fixture to the wall through a fixture holder, said bracket comprising:
(a) a wall mount subassembly to be mounted to the wall, said wall mount subassembly comprising a body member having a first side for being disposed outwardly away from the wall and for receiving and mounting the fixture holder, and a second side for being disposed inwardly toward the wall;
(b) an interface subassembly adapted for serving as an interface between said wall mount subassembly and a fixture holder, said interface subassembly comprising (i) an interface plate configured to receive and hold the fixture holder, and to be secured to said wall mount subassembly, and (ii) a retainer retaining the fixture holder to said interface subassembly; and
(c) mounting apparatus for mounting said interface subassembly to said wall mount subassembly, said interface subassembly having an axis of pivotation about said securing apparatus, said interface plate being in substantially the same plane as said wall mount subassembly when the fixture holder is mounted to both the interface plate and the body member.

47. A bracket as in claim 46 wherein the plane of said interface plate is spaced from and substantially parallel with the axis of pivotation of the interface subassembly.

48. A bracket as in claim 46, wherein the axis of pivotation is disposed inwardly of said first side of said body member.

49. A bracket adapted to be mounted along a wall of a building, for thus mounting a fixture to the wall, said bracket comprising:

(a) a wall mount subassembly to be mounted to the wall, said wall mount subassembly comprising a body member having a first side for being disposed outwardly away from the wall, and a second side for being disposed inwardly toward the wall;

(b) an interface subassembly adapted for serving as an interface between said wall mount subassembly and an elongate fixture holder, said interface subassembly comprising (i) an interface plate configured to receive and hold the elongate fixture holder, and to be secured to said wall mount subassembly, and (ii) a retainer retaining the elongate fixture holder to said interface subassembly;

(c) securing apparatus for securing said interface subassembly to said wall mount subassembly, said interface subassembly having an axis of pivotation about said securing apparatus; and (d) an adjuster mounted in said body member for adjusting the orientation of the elongate fixture holder to be received in said bracket, relative to said body member.

* * * * *